United States Patent
Rao et al.

(10) Patent No.: US 9,015,333 B2
(45) Date of Patent: Apr. 21, 2015

(54) APPARATUS AND METHODS FOR HANDLING NETWORK FILE OPERATIONS OVER A FIBRE CHANNEL NETWORK

(75) Inventors: Raghavendra J. Rao, Bangalore (IN); Maurilio Cometto, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1186 days.

(21) Appl. No.: 12/641,909

(22) Filed: Dec. 18, 2009

(65) Prior Publication Data

US 2011/0153780 A1    Jun. 23, 2011

(51) Int. Cl.
- G06F 15/16 (2006.01)
- H04L 29/08 (2006.01)
- H04L 29/12 (2006.01)
- H04L 29/06 (2006.01)

(52) U.S. Cl.
CPC ......... H04L 67/1097 (2013.01); *H04L 61/6045* (2013.01); *H04L 29/06068* (2013.01)

(58) Field of Classification Search
CPC ............ H04L 67/1097; H04L 29/06068; H04L 61/6045
See application file for complete search history.

(56) References Cited

U.S. PATENT DOCUMENTS

| | | | |
|---|---|---|---|
| 6,160,811 A | 12/2000 | Partridge et al. | |
| 6,304,912 B1 | 10/2001 | Oguchi et al. | |
| 6,385,624 B1 * | 5/2002 | Shinkai | 709/201 |
| 6,421,730 B1 | 7/2002 | Narad et al. | |
| 6,430,184 B1 | 8/2002 | Robins et al. | |
| 6,560,630 B1 | 5/2003 | Vepa et al. | |
| 6,601,101 B1 | 7/2003 | Lee et al. | |
| 6,606,690 B2 | 8/2003 | Padovano | |
| 6,697,846 B1 | 2/2004 | Soltis | |
| 6,738,821 B1 | 5/2004 | Wilson et al. | |
| 6,792,507 B2 | 9/2004 | Chiou et al. | |
| 6,826,613 B1 | 11/2004 | Wang et al. | |
| 6,907,457 B2 * | 6/2005 | Merrell et al. | 709/217 |
| 6,985,975 B1 | 1/2006 | Chamdani et al. | |
| 7,010,469 B2 | 3/2006 | Anderson et al. | |
| 7,027,413 B2 | 4/2006 | Lee et al. | |
| 7,031,904 B1 | 4/2006 | Wilson et al. | |

(Continued)

FOREIGN PATENT DOCUMENTS

WO    WO 2005/091826    10/2005

OTHER PUBLICATIONS

U.S. Appl. No. 10/836,368, filed Apr. 29, 2004.

(Continued)

*Primary Examiner* — Patrice Winder
*Assistant Examiner* — Nam Tran
(74) *Attorney, Agent, or Firm* — Novak Druce Connolly Bove + Quigg LLP

(57) ABSTRACT

Disclosed are methods and apparatus for facilitating transmission of file access type messages over a Fibre Channel (FC) network. In one embodiment, at a file interposed access protocol layer of a file access client, a file access type operation is received from a file access type layer at the client device. The interposed layer may be interposed between an upper file access layer and an FC layer. The file access type operation specifies a request pertaining to file access. At the interposed file access protocol layer of the client, the file access type operation is modified into one or more sequence of operations so that the operations can be transmitted over an FC network. A sequence of operations are transmitted to an file access server over the FC network.

13 Claims, 9 Drawing Sheets

(56) References Cited

U.S. PATENT DOCUMENTS

| | | | |
|---|---|---|---|
| 7,089,293 | B2 | 8/2006 | Grosner et al. |
| 7,120,705 | B2 | 10/2006 | Arai et al. |
| 7,127,638 | B1 | 10/2006 | Sardella et al. |
| 7,180,909 | B1 | 2/2007 | Achler |
| 7,197,047 | B2 | 3/2007 | Latif et al. |
| 7,245,632 | B2 | 7/2007 | Heffernan et al. |
| 7,249,227 | B1 | 7/2007 | Pittman |
| 7,260,112 | B2 | 8/2007 | Moretti et al. |
| 7,269,168 | B2 | 9/2007 | Roy et al. |
| 7,269,696 | B2 | 9/2007 | Muhlestein et al. |
| 7,284,070 | B2 | 10/2007 | Boucher et al. |
| 7,295,561 | B1 | 11/2007 | Yao et al. |
| 7,299,290 | B2 | 11/2007 | Karpoff |
| 7,305,670 | B2 | 12/2007 | Ogasawara et al. |
| 7,313,142 | B2 | 12/2007 | Matsuo et al. |
| 7,313,614 | B2 | 12/2007 | Considine et al. |
| 7,320,037 | B1 | 1/2008 | Maturi et al. |
| 7,325,051 | B2 | 1/2008 | Das et al. |
| 7,353,305 | B2 | 4/2008 | Pangal et al. |
| 7,362,702 | B2 | 4/2008 | Terrell et al. |
| 7,376,765 | B2 | 5/2008 | Rangan et al. |
| 7,386,610 | B1 | 6/2008 | Vekiarides |
| 7,401,093 | B1 | 7/2008 | Hamilton et al. |
| 7,404,000 | B2 | 7/2008 | Lolayekar et al. |
| 7,406,484 | B1 | 7/2008 | Srinivasan et al. |
| 7,412,588 | B2 | 8/2008 | Georgiou et al. |
| 7,415,506 | B1 | 8/2008 | Gajjar et al. |
| 7,415,723 | B2 | 8/2008 | Pandya |
| 7,426,212 | B2 | 9/2008 | Someya et al. |
| 7,426,576 | B1 | 9/2008 | Banga et al. |
| 7,433,351 | B1 | 10/2008 | Pelissier et al. |
| 7,457,982 | B2 | 11/2008 | Rajan |
| 7,460,473 | B1 | 12/2008 | Kodama et al. |
| 7,478,101 | B1 | 1/2009 | Manley |
| 7,483,423 | B2 | 1/2009 | Grewal et al. |
| 7,487,283 | B2 | 2/2009 | Sivertsen |
| 7,496,688 | B2 | 2/2009 | Pepper |
| 7,535,913 | B2 | 5/2009 | Minami et al. |
| 7,558,264 | B1 | 7/2009 | Lolayekar et al. |
| 7,583,681 | B2 | 9/2009 | Green |
| 7,586,942 | B2 | 9/2009 | Golasky et al. |
| 7,590,807 | B2 | 9/2009 | McGovern et al. |
| 7,594,002 | B1 | 9/2009 | Thorpe et al. |
| 7,627,693 | B2 | 12/2009 | Pandya |
| 7,656,905 | B2 | 2/2010 | Sheth et al. |
| 7,688,735 | B1 | 3/2010 | Berman |
| 7,711,539 | B1 | 5/2010 | Kimmel et al. |
| 7,743,111 | B2 | 6/2010 | Soltis |
| 7,752,361 | B2 | 7/2010 | Rangan et al. |
| 7,792,923 | B2 | 9/2010 | Kim |
| 7,864,758 | B1 | 1/2011 | Lolayekar et al. |
| 2001/0037406 | A1 | 11/2001 | Philbrick |
| 2001/0049740 | A1 | 12/2001 | Karpoff |
| 2002/0002625 | A1 | 1/2002 | Vange et al. |
| 2002/0026502 | A1 | 2/2002 | Phillips et al. |
| 2002/0078299 | A1 | 6/2002 | Chiou et al. |
| 2002/0120741 | A1 | 8/2002 | Webb et al. |
| 2003/0009473 | A1* | 1/2003 | Ham et al. .......... 707/102 |
| 2003/0051135 | A1 | 3/2003 | Gill et al. |
| 2004/0030668 | A1 | 2/2004 | Pawlowski |
| 2004/0030766 | A1 | 2/2004 | Witkowski |
| 2004/0093411 | A1 | 5/2004 | Elzur et al. |
| 2004/0103220 | A1 | 5/2004 | Bostick et al. |
| 2004/0117496 | A1 | 6/2004 | Mittal et al. |
| 2004/0210584 | A1 | 10/2004 | Nir et al. |
| 2004/0236866 | A1 | 11/2004 | Dugatkin et al. |
| 2005/0015642 | A1 | 1/2005 | Hannel et al. |
| 2007/0100792 | A1* | 5/2007 | Lent et al. .................. 707/1 |
| 2009/0063658 | A1* | 3/2009 | Westerhoff et al. ........... 709/219 |
| 2010/0131669 | A1* | 5/2010 | Srinivas et al. ............... 709/233 |

OTHER PUBLICATIONS

Office Action dated Apr. 30, 2008 for U.S. Appl. No. 10/836,368.
Final Office Action dated Oct. 15, 2008 for U.S. Appl. No. 10/836,368.
Office Action dated Mar. 10, 2009 for U.S. Appl. No. 10/836,368.
Office Action dated Sep. 28, 2009 for U.S. Appl. No. 10/836,368.
International Search Report and Written Opinion dated Jul. 19, 2006, from PCT Patent Application No. PCT/US05/04941.
Office Action dated May 26, 2009 from Canadian Patent Application No. 2,555,428.
Caroline Larson et al., Introduction to ISCSI, Version 1.0, Mar. 2002, 6 pages.
Ahmad Zamer, Clearing the Confusion: A Primer on Internet Protocol Storage, Part II, Storage Networking Industry Association, 95 pages.
Request for Comments: 2625, IP and ARP Over Fibre Channel, Jun. 1999, 71 pages.
Krueger, M. et al. "Small Computer Systems Interface Protocol over the Internet (iSCSI) Requirements and Design Considerations," RFC 3347, Jul. 2002, pp. 1-26.
Weber, R. et al. "Fibre Channel (FC) Frame Encapsulation," RFC 3643, Dec. 2003, pp. 1-20.
Teow, K.S. "Definitions of Managed Objects for the Fabric Element in Fibre Channel Standard," RFC 2837, May 2000, pp. 1-48.
Crawford, M. "A Method for the Transmission of IPv6 Packets over FDDI Networks, " RFC 2019, Oct. 1996, pp. 1-6.
Flick, J. "Definitions of Managed Objects for the Ethernet-like Interface Types," RFC 3635, Sep. 2003, pp. 1-64.
Balay, R. et al. "IS-IS Mesh Groups," RFC 2973, Oct. 2000, pp. 1-8.
Gibson, Garth and Van Meter, Rodney, "Network Attached Storage Architecture," Communications of the ACM, vol. 43, Issue 11, Nov. 2000, pp. 37-45.
Nagle, David F. et al. "Network Support for Network-Attached Storage," Proceedings of Hot Interconnects, Aug. 18-20, 1999, pp. 1-6.
Gibson, Garth A. et al. "File Server Scaling with Network-Attached Secure Disks, "Proceedings of the 1997 ACM Sigmetrics International Conference on Measurement and Modeling of Computer Systems, 1997, pp. 272-284.
Riedel, Erik. "Active Disks-Remote Execution for Network-Attached Storage," Doctor of Philosophy Dissertation, School of Computer Science, Carnegie Mellon University, 1999, pp. 1-203.
Menon, J. et al. "IBM Storage Tank—A Heterogeneous Scalable SAN File System," IBM Systems Journal, vol. 42, No. 2, 2003, pp. 250-267.
Knowles, M. "Survey of the Storage Evolution," Proceedings of the User Group Conference, Jun. 9-13, 2003, pp. 362-367.
Second Action dated Jun. 11, 2010 from Canadian Patent Application No. 2,555,428.
Translation of Second Office Action dated Sep. 29, 2010 for China Patent Application No. 200580004483.1.
Final Office Action dated Mar. 3, 2010 for U.S. Appl. No. 10/836,368.
First Office Action dated Jan. 8, 2010 for China Patent Application No. 200580004483.1.
Notice of Allowance dated Jan. 25, 2011 for U.S. Appl. No. 10/836,368.
Third Action dated Aug. 1, 2011 from Canadian Patent Application No. 2,555,428.
Third Office Action dated Aug. 1, 2011 from Canadian Patent Application No. 2,555,428.
Third Office Action dated Dec. 16, 2011 for China Patent Application No. 200580004483.1.
Fourth Office Action dated May 4, 2012 for China Patent Application No. 200580004483.1.
Search Report dated Apr. 2, 2012 from EP Patent Application No. 05713673.1.

* cited by examiner

APPARATUS AND METHODS FOR HANDLING NETWORK FILE OPERATIONS OVER A FIBRE CHANNEL NETWORK

BACKGROUND OF THE INVENTION

The present invention is related to techniques and mechanisms for managing remote storage in a computer network.

In recent years, the capacity of storage devices has significantly increased as the demand for storage has also increased. Although various types of storage systems, such as storage area network (SAN) and network attached storage (NAS) are available, improved systems and methods for storing and managing data would be beneficial so as to enhance the performance capabilities of such systems and methods.

DESCRIPTION OF EXAMPLE EMBODIMENTS

Reference will now be made in detail to specific embodiments of the invention. Examples of these embodiments are illustrated in the accompanying drawings. While the invention will be described in conjunction with these specific embodiments, it will be understood that they are not intended to limit the invention to one embodiment. On the contrary, they are intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1A:
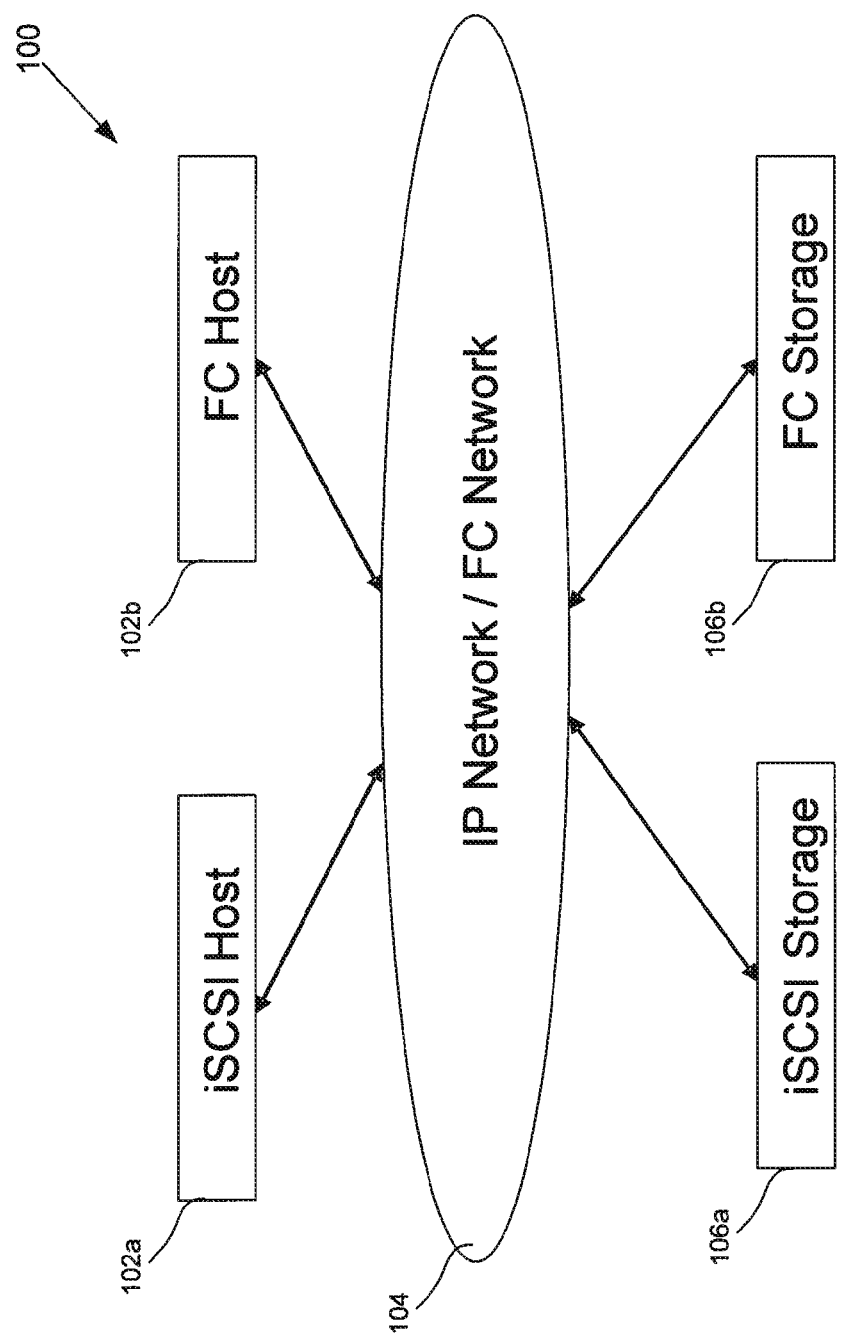
FIG. 1A is a diagrammatic representation of a network segment for handling requests within a storage area network (SAN).

FIG. 1A is a diagrammatic representation of a network segment 100 for handling requests within a storage area network (SAN). In a SAN system, an iSCSI (Internet Small Computer System Interface) configured host 102a or an FC (Fibre Channel) configured host 102b, by way of examples, may access data blocks on an iSCSI storage device 106a or an FC storage device 106b, respectively, via an IP or FC network 104. In this type of system, a host generally accesses a storage target via a switch (not shown). In a SAN network, SCSI targets, such as storage disks or physical logic units (PLUNs), are directly accessible by SCSI initiators (e.g., hosts). Similarly, even when VLUNs (virtual logical units) are implemented, the VLUNs are visible and accessible to the SCSI initiators. Thus, each initiator will typically identify those PLUNs or VLUNs that are available to it. More specifically, the initiator typically determines which SCSI target ports are available to it. The initiator may then ask each of those SCSI target ports which PLUNs or VLUNs are available via those SCSI target ports. In sum, data is accessed via "data blocks" in a SAN system.

Since protocols for SAN merely allow data to be moved in "blocks", SAN is associated with poor data management capabilities, as these "blocks" have no semantic representation to the content of the data stored. Even "intelligent services" that are implemented for SAN, such as Snapshots, Replication, Migration, etc., are limited as these services still understand very little about user data, e.g., the semantics of data. Even if a storage device were to store data in sophisticated ways such as file system or a database, the storage would still be exported in the form of blocks. As a result, the hosts may need to add their own volume managers, file systems, etc., in order to be able to store user data.

Figure 1B:
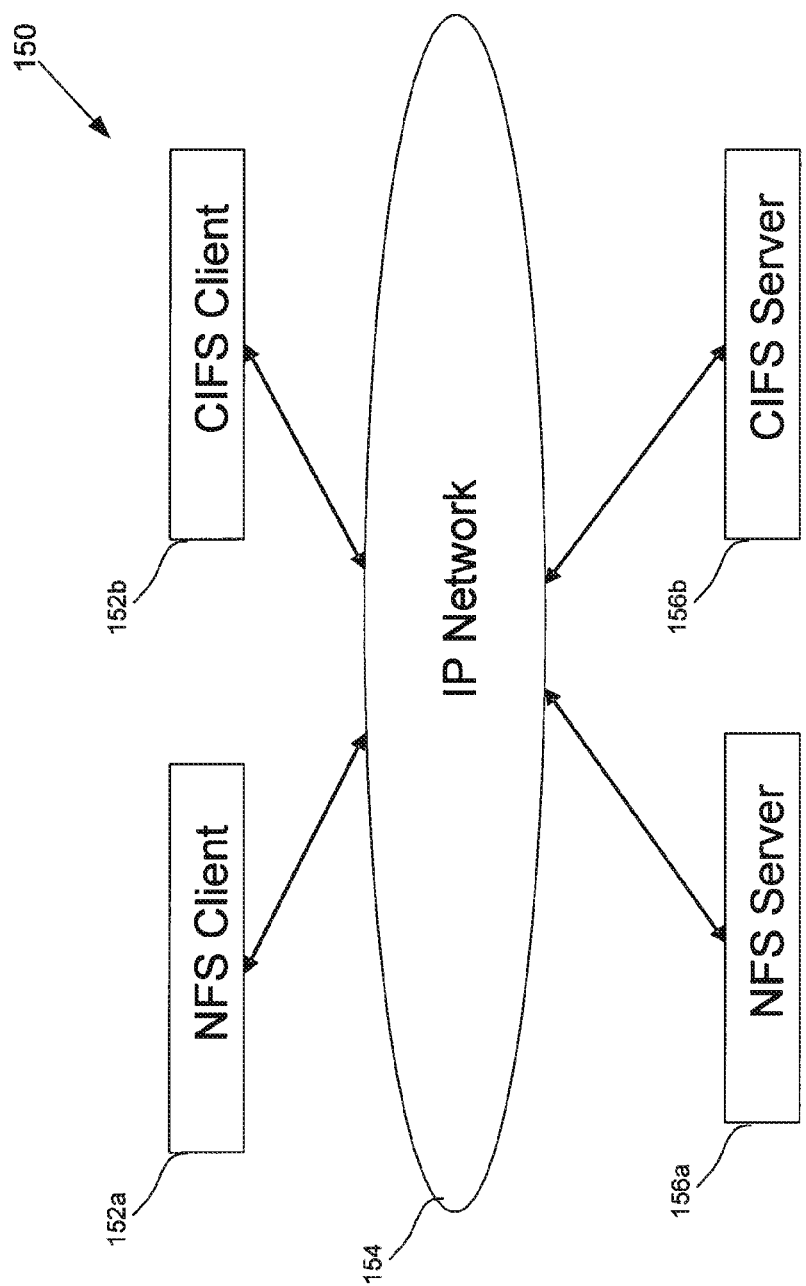
FIG. 1B is a diagrammatic representation of a network segment for handling requests within a network attached storage (NAS) system.

Network attached storage or NAS allows data to be accessed as file systems or hierarchical namespaces. FIG. 1B is a diagrammatic representation of a network segment 150 for handling requests within a network attached storage (NAS) system. In a NAS system, a NFS (network file system) configured host 152a or a CIFS (Common Internet File System) configured host 152b, by way of examples, may access data on an NFS Server 156a or a CIFS server 156b, respectively, via an IP network 154. In general, an NFS type configuration may implement one or more of the following protocols: NFS (e.g., NFS V3, NFS V4), NLM (Network Lock Manager, NFS-ACL (NFS access control list)) over RPC (Remote Procedure Call) and XDR (External Data Representation) transport. Similarly, network file access over CIFS may use either UDP or TCP transport protocol.

Although a NAS system can present data in a high level format (e.g., file systems), NAS systems tend to sacrifice performance to do so. For example, upper layer transport protocols, such as TCP or UDP, which are typically utilized to transmit data over an IP network 154 in the NAS system 150, can cause different protocol layers to make copies of the incoming or outgoing data in the form of buffering (e.g., the mode of data transfer can be "unsolicited" at lower layers). One approach includes collapsing all the layers to an offloaded NIC adapter. In an enterprise or datacenter environment, the number of TCP connections can be significant (e.g., numbering in the 10,000's) and is likely to further increase as the capacity and bandwidth of networks expand, the number and size of buffers in the offloaded NIC can also be significant thus making it either impractical or costly.

Certain embodiments of the present invention allow NF operations to be transported over an FC network, as well as an IP network, while minimizing the number of data copies that are made at each receiving or sending device. An NF operation generally specifies a request pertaining to file access (e.g., write operation, read operation, access operation, lookup operation, etc.). An NF operation can be implemented in any suitable file access protocol, such as RPC or CIFS. In certain embodiments, files can be accessed over a SAN. Certain embodiments provide access to files whether such access is from an IP network, Fibre Channel, or Data Center Ethernet (DCE). Additionally, there will be no need for a "SAN or NAS" boundary.

Figure 1C:
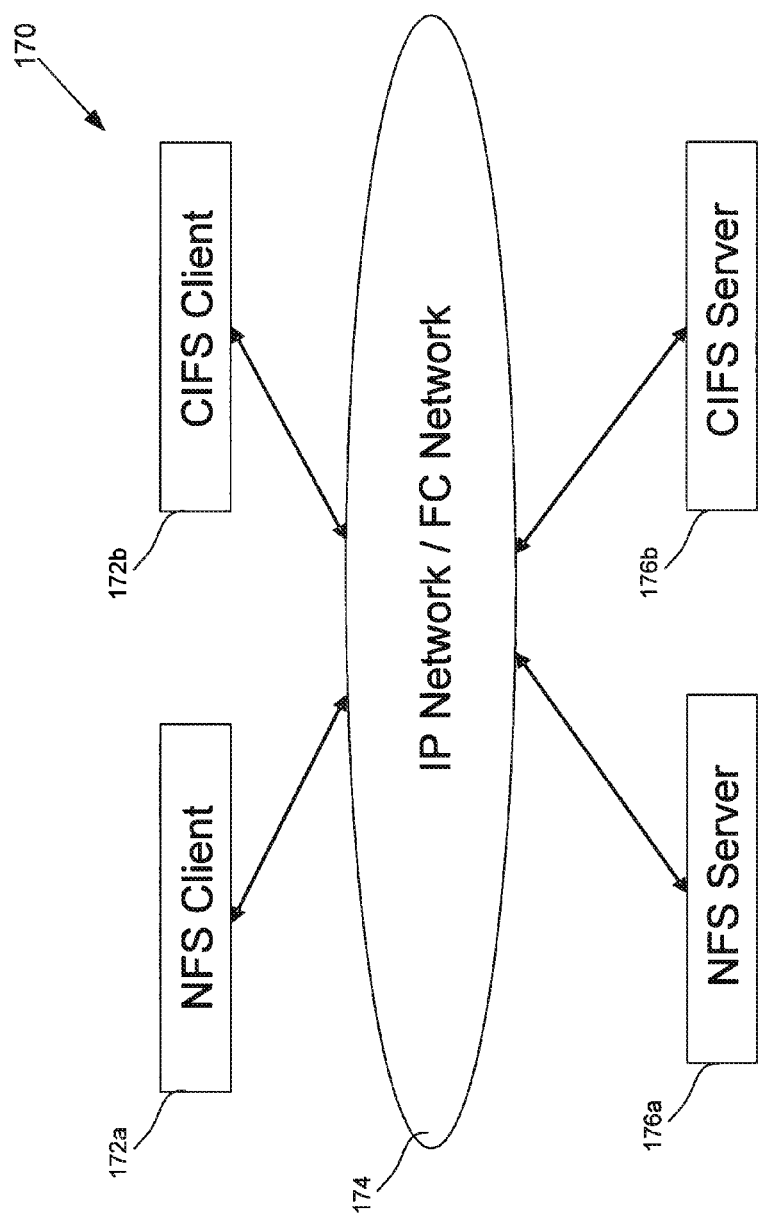
FIG. 1C is a diagrammatic representation of a network segment for handling network file (NF) operations over both a Fiber Channel (FC) and IP network in accordance with one embodiment of the present invention.

FIG. 1C is a diagrammatic representation of a network segment 170 for handling network file (NF) operations over both a Fiber Channel (FC) and IP network in accordance with one embodiment of the present invention. As shown, an NFS (network file system) configured host 172a or a CIFS (Common Internet File System) configured host 172b, by way of examples, may access data on an NFS server 176a or a CIFS server 176b, respectively, via an FC Network and IP network 154.

Figure 2:
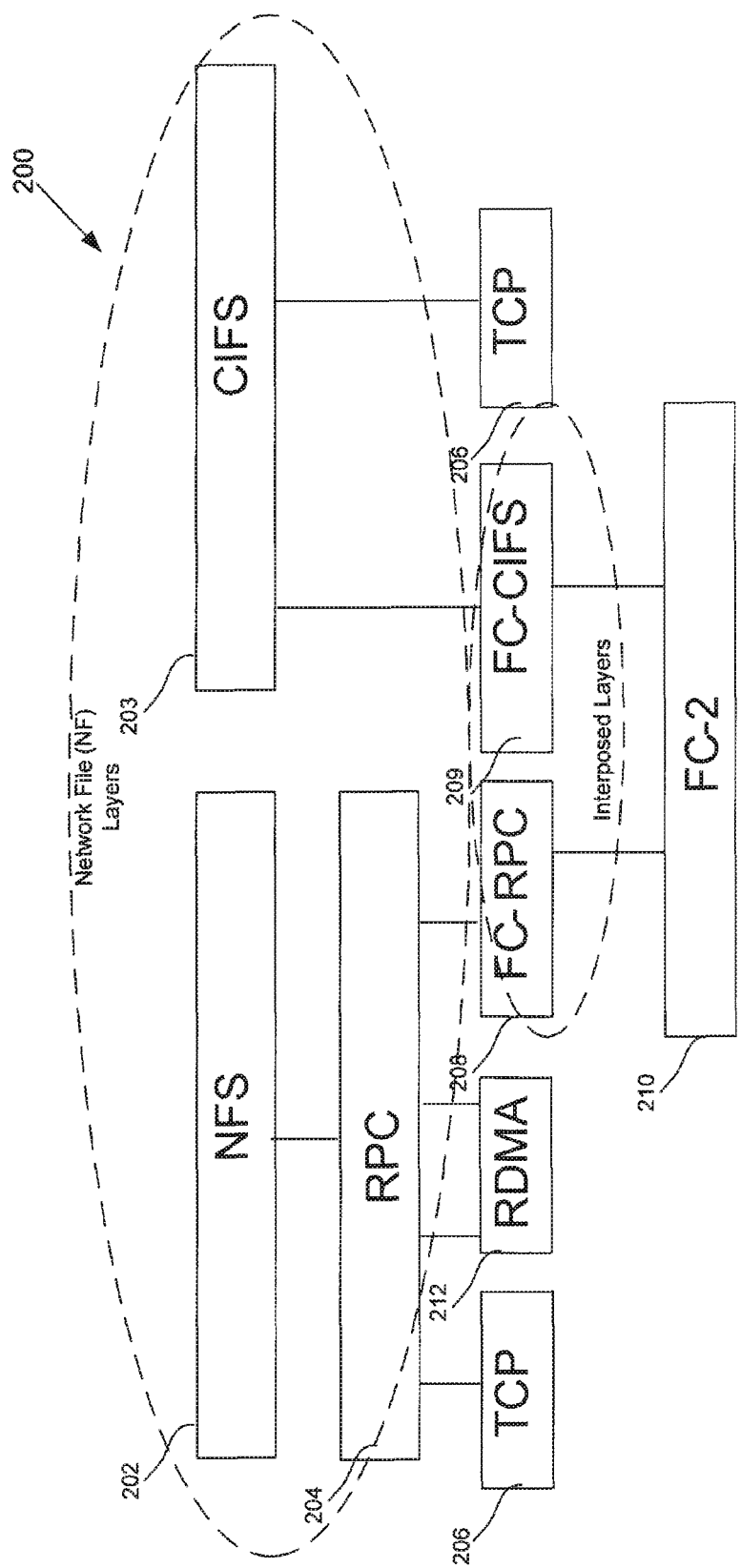
FIG. 2 is a diagrammatic representation of a system with a plurality of communication layers for handling NF operations and replies over a Fibre Channel (FC) network in accordance with a specific implementation of the present invention.

In one embodiment, a newly defined interposed file access protocol allows file access in SAN. The same file can also be shared over IP networking using traditional file access protocols, such as NFS and FCP or CIFS, in NAS. In a specific implementation, a FC-RPC or FC-CIFS layer can be configured between an upper network file access protocol layers (e.g., RPC or CIFS) and an FC layer of a particular device. FIG. 2 is a diagrammatic representation of a system with a plurality of communication layers for handling NF network file operations and replies over a Fibre Channel (FC) network in accordance with a specific implementation of the present invention. As shown, upper network file layers may include an NFS layer 202 over an RPC layer 203 and/or may include a CIFS layer 203. The NFS layer 202 may utilize any suitable NFS type protocols, such as NFS V3, NFS V4, NLM (Network Loadable Module), or NFS ACL (access control list) protocol. The network file layers may also include a XDR (eXternal Data Representation) layer (not shown). The network file layers may utilize other or additional network file access protocols.

An FC-RPC layer 208 may be configured for translating network file operations sent from and to RPC layer 204 into one or more operations that are sent over a FC network via an FC layer, such as FC-2 layer 210. Likewise, FC-CIFS 209 may be configured for translating network file operations sent from and to CIFS layer 203 into one or more operations that are sent over a FC network via an FC layer. In certain embodiments, the FC-RPC layer 208 facilitates the running of native NFS and RPC over native FC, while the FC-CIFS 209 layer facilitates the running of native CIFS over native FC.

Other transport layers, such as TCP (Transmission Control Protocol) layer 206 or RDMA (Remote Direct Memory Access) layer 212 may also be used, independently of the layers 208 and 209, to communicate over any suitable type of network, such as an IP network.

In a specific implementation, the interposed file access protocol layers (FC-RPC or FC-CIFS) are new upper layer protocols that can, for example, encapsulate network file access type operations over FC by using additional protocol specific headers (FC-RPC or FC-CIFS). In a specific FC-RPC example, the FC-RPC layer can exchange all network file operations, other than READ and WRITE operations, as FC_RPC_REQ request and FC_RPC_RESP response messages. These messages (FC_RPC_REQ and FC_RPC_RESP) can carry an additional FC-RPC specific header to identify the type of request or response message, the length of the message, etc. In addition, the FC-RPC layer on the NFS client side, for example, can split a Read or Write operation into the following sequence of messages: 1) an unsolicited command (FC_RPC_REQ) to indicate the type of request (read or write), the amount of data transfer requested, etc. 2) a solicited data transfer (FC_RPC_DATA) to transfer the data between the client and the server and lastly 3) a FC_RPC_RESP message indicating the status of the operation from the server to the client. The following examples are directed towards a FC-RPC layer for handling RPC network file operations. However, similar techniques can be utilized for CIFS operations.

Figure 3:
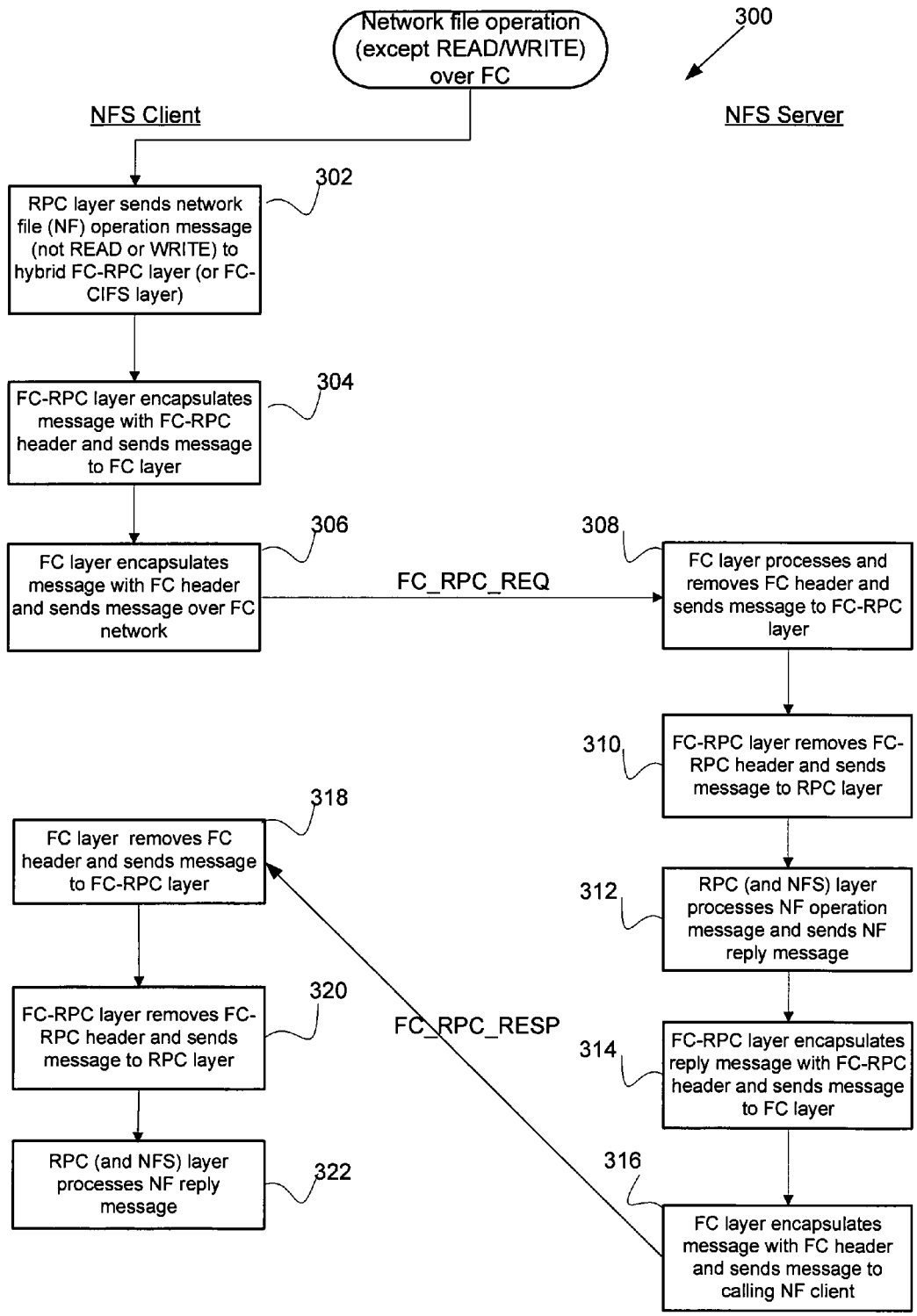
FIG. 3 is a flowchart illustrating a procedure for handling an NF operation (except read or write) over a Fibre Channel network in accordance with one embodiment of the present invention.

FIG. 3 is a flowchart illustrating a procedure 300 for handling a network file (NF) operation (except a read or write operation) over a Fibre Channel network in accordance with one embodiment of the present invention. For example, this procedure 300 pertains to NF operations for performing a look-up (NFSPROC3_LOOKUP), check access permission (NFSPROC3_ACCESS), create file (NFPROC3_CREATE), remove file (NFSPROC3_REMOVE, create directory (NFSPROC3_MKDIR), remove directory (NFSPROC3_RMDIR), rename file or directory (NFSPROC3_RENAME), read directory (NFSPROC3_READDIR), get file system's attributes (NFSPROC3_FSSTAT), etc. Operations that typically may occur on an NFS client are shown on the left portion of the diagram, while operations that typically occur on a NFS server are shown on the right side of the diagram. Initially, the RPC layer of an NFS client sends an NF operation message, which is not read or write, to FC-RPC layer in operation 302. An NF operation generally includes an RPC header for specifying a type of operation or request and a payload for specifying arguments for such operation.

Although the following examples describe receiving an NF operation from RPC and NFS layers, the NF operation can be received from any number and type of file access type layers, in addition to these specific network file layers. Also, alternative embodiments may utilize an alternative network file protocol, instead of RPC and NFS protocols, and in addition to other network file protocols and layers that are configured to generate, handle, or receive network file operations.

In the illustrated example, the receiving FC-RPC layer may encapsulate the NF operation message with a FC-RPC header and send the message to the FC layer in operation 304. In general, the FC-RPC header may include any suitable number and type of fields for identifying the type of message and the length of the message (e.g., including the header and the encapsulated network file message). In other types of messages (e.g., a data transfer ready response), the FC-RPC header may also specify data transfer parameters as further described herein.

The message type can generally indicate the type of message, such as whether the message is a request other than a read or a write request, a response, a write request, a read request, a data transfer ready response, or data transfer. In this example, when the RPC header specifies NF operation type other than a read or write type, the FC-RPC layer can specify the type in the FC-RPC header as a simple request, i.e., a request that excludes a read or a write request. In the illustrated example, the entire RPC message is carried in the payload of the FC-RPC message that is sent to the FC layer.

The receiving FC layer may then encapsulate the FC-RPC message with an FC header and send the message over the FC network in operation 306. In one embodiment, an FC_RPC_REQ message is sent to the NFS server. The FC header can specify that a FC-RPC message is encapsulated. For example, the FC header may include a type field that specifies that an FC-RPC message is being sent for the RPC protocol.

Figure 6:
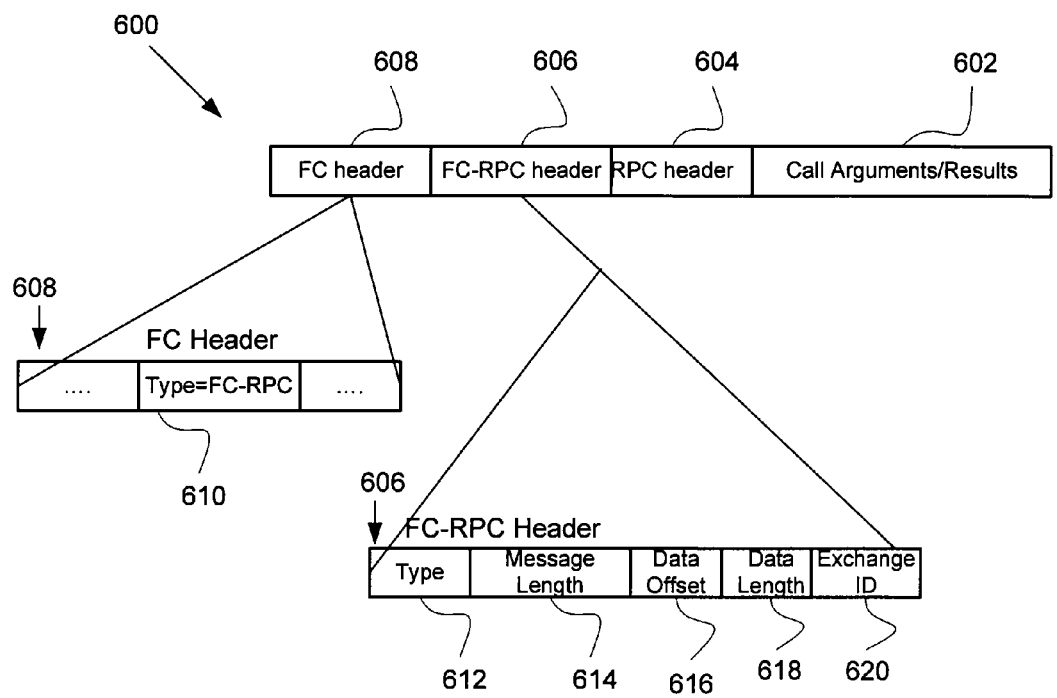
FIG. 6 includes a diagrammatic representation of a FC-RPC type message in accordance one example implementation of the present invention.

FIG. 6 includes a diagrammatic representation of a FC-RPC type message 600 in accordance one example implementation of the present invention. As shown, a FC-RPC type message 600 may include the original RPC arguments or results 602, the original RPC header 604, a new FC-RPC header 606, and an FC header 608. In certain message types, the RPC header 604 and/or the payload 602 may be removed. The new FC-RPC header 606 may include a type field 612, a message length field 614, and one or more flags (not shown) for specifying further protocol extensions, a data offset field 616, a data length field 618, an exchange identifier, etc. The FC header 608 may also include a type field 610, e.g., indicating an "FC-RPC" type of message. A FC-CIFS type message can have similar headers and payload.

After the client sends the FC-RPC request message, an FC layer at the NFS server may then process and remove the FC header and send the message to a FC-RPC layer of the NFS server in operation 308. For example, the FC layer determines that the received message is an FC-RPC type of message based on the type field of the FC header.

The FC-RPC layer may then process the FC-RPC request message by removing the FC-RPC header and sending the decapsulated message to the RPC layer in operation 310. For example, the FC-RPC layer may determine that the received message is a simple request message (not a write or read request type) based on the type field of the FC-RPC header. A simple request (non-write or non-read request) can be merely sent to the RPC layer without further processing by the FC-RPC layer.

The receiving RPC layer (and NFS layer) of the server may then process the NF message and send an NF reply message (e.g., with an RPC header) in operation 312. The FC-RPC layer of the server may then receive and encapsulate the reply message with a FC-RPC header and send the message to the FC layer of the server in operation 314. For example, the FC-RPC header now indicates a response type. The FC layer of the server may then encapsulates the response message with an FC header and send the message to the calling NFS client over the FC network in operation 316. For example, an FC_RPC_RESP message is sent from the NFS server to the NFS client.

An FC layer at the client may then remove the FC header and send the response message to the FC-RPC layer of the NFS client in operation 318. For example, the FC layer determines that the message is a FC-RPC type message based on the type field of the FC header and sends the message without the FC header to the FC-RPC layer of the client.

The FC-RPC layer of the client may then process the FC-RPC response message by removing the FC-RPC header and sending the message to the RPC layer in operation 320. For example, the FC-RPC may determine that the received message is a response type message based on the type field of the FC-RPC header and send a decapsulated RPC message to the RPC layer. The RPC layer (and NFS layer) may then process the reply message in operation 322, for example, according to various RPC and NFS type protocols.

As background, when an NFS client sends unsolicited write network file (NF) messages to an NFS server via an IP network, certain receiving layers (e.g., the TCP, UDP, and/or RPC layers) of the server each typically buffer the received write messages, which each contain the data and an RPC header specifying a file handle, data length, and data offset. These copying operations can utilize significant processing and memory resources.

Figure 4:
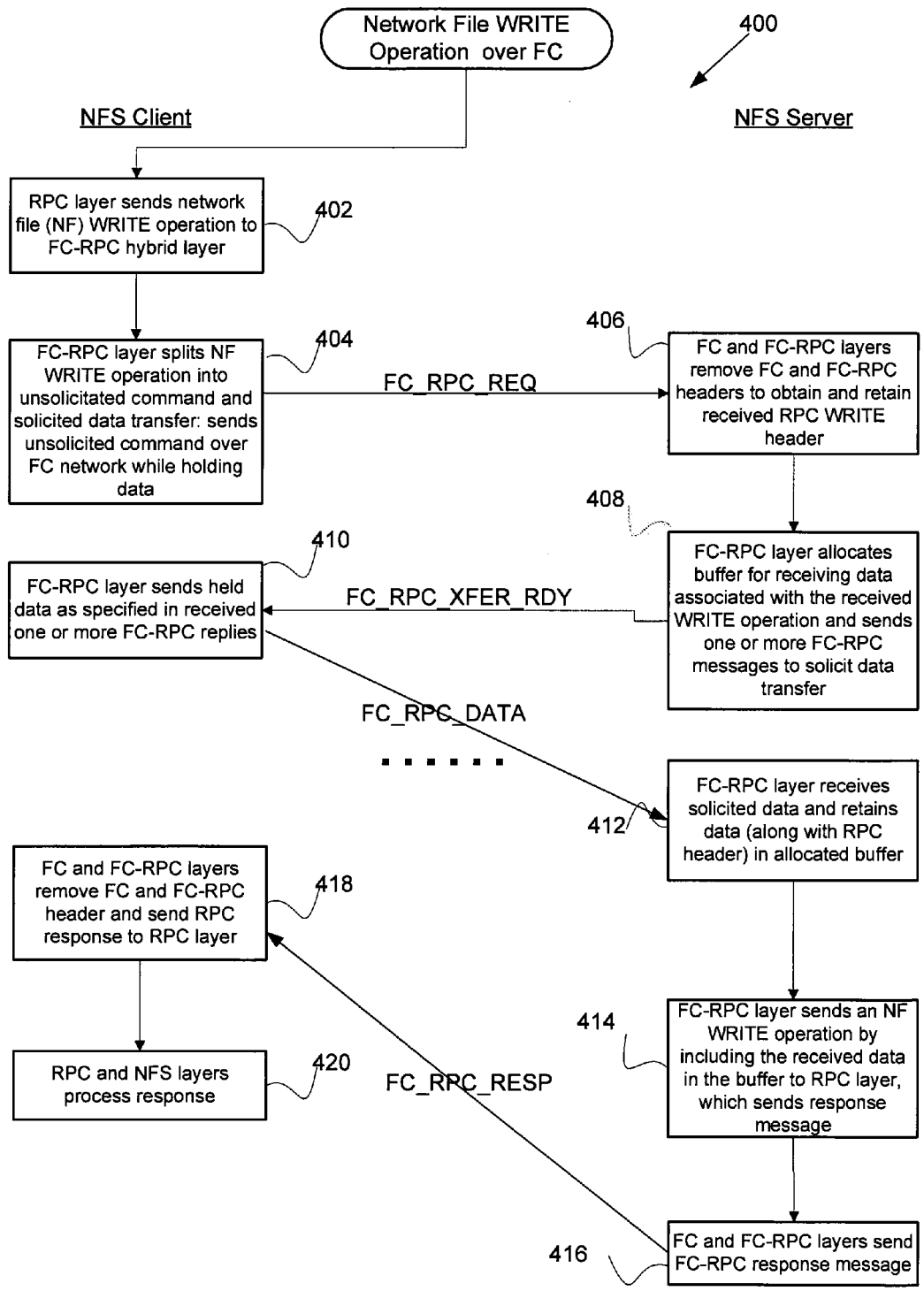
FIG. 4 is a flowchart illustrating a procedure for handling an NF write operation over a Fibre Channel network in accordance with a specific implementation of the present invention.

In certain embodiments, write NF type operations are handled over FC network and processed with minimum copying operations. FIG. 4 is a flowchart illustrating a procedure 400 for handling a network file (NF) write operation over a Fibre Channel network in accordance with a specific implementation of the present invention. Initially, an RPC layer at the NFS client sends an NF write operation to the FC-RPC layer in operation 402. For example, the NF write operation can include data and an RPC header that specifies a file handle, file offset, and data length (e.g., number of bytes).

The upper FC-RPC layer processes the write operation by splitting the NF write operation into an unsolicited command and solicited data transfer and sending the unsolicited command over the Fibre Channel network while holding the data in operation 404. For example, an FC_RPC_REQ message having an FC-RPC header that indicates a write request type is sent to the FC layer. The FC layer adds an FC layer indicating an FC-RPC type to the message, which is then sent from the NFS client to the NFS server.

The FC and FC-RPC layers of the NFS server may then process the write request message by removing the FC and FC-RPC headers to obtain and retain the received RPC write header portion in operation 406. For example, the FC layer removes the FC header, while the FC-RPC removes the FC-RPC header and retains the NF write operation's RPC header.

The FC-RPC layer may then allocate a buffer for later receiving the data associated with the received NF write operation and send one or more FC-RPC messages to solicit data transfer in operation 408. For example, without calling the RPC layer, a buffer having a length that is large enough to include the retained NF write operation's RPC header and the data as specified by the NF write operation (e.g., in the data length field 620 of the RPC header 604) is allocated and one or more FC_RPC_XFER_RDY messages may be sent from the NFS server to the NFS client to request that the client send specific data portions to the server.

Each FC_RPC_XFER_RDY message may include an FC header that specifies an FC-RPC type and an FC-RPC header that specifies a data transfer type response (e.g., 612 of FIG. 6), a message length, a data offset (616), a data length (618), and an exchange identifier (620). The exchange identifier was associated with the original exchange identifier that was associated by the client with the original write request message, for example in the request FC-RPC or RPC header. Since the data can be transferred all at once or in chunks, the data length and data offset can indicate how much data and from what offset for each data transfer. For example, if 4 kbytes of data is to be written, a first FC_RPC_XFER_RDY message can specify 1 kbytes length of data at a zero offset, and a second FC_RPC_XFER_RDY message can specify 3 kbytes length at a 1 kbyte offset. The FC_RPC_XFER_RDY message does not have to include an NFS header or payload since such message can be merely processed by the FC and FC-RPC layers of the client.

In response to the FC_RPC_XFER_RDY message, the FC and FC-RPC layers of the NFS client may then send the held data as specified in the received one or more FC-RPC replies in operation 410. For example, data may be sent in the form of FC-RPC-DATA type messages, which does not need to include an NFS header. In one implementation, the FC-RPC-DATA message includes an FC header, an FC-RPC header, and the data. The FC-RPC header may also specify the data length, data offset, and exchange identifier as specified in the XFER-RDY message.

An FC-RPC layer of the NFS server may then receive the solicited data from the NFS client and retain the data in the allocated buffer (along with the retained NF write operation RPC header) in operation 412. After all the data is received, the FC-RPC layer then sends an NF write operation by including the received data in the buffer to the RPC layer (and subsequently to NFS layer) in operation 414.

The NF write operation may also result in the RPC (and NFS) layer sending a reply in operation 414. The FC and FC-RPC layers of the server can then send an FC-RPC response type message to the client in operation 416. For example, an FC_RPC_RESP message may include an FC header that specifies an FC-RPC type, a FC-RPC header that specifies the response type, and the RPC reply. The FC and FC-RPC layers of the NFS client may then remove the FC and FC-RPC header and send the RPC response to the RPC layer in operation 418. The network file layers (e.g., RPC and NFS) may then process the response in operation 420.

In certain implementations, hardware acceleration adapters may be used by any layer to quickly write data to a specified buffer. For example, an FC hardware adapter may be operable to understand the layer (e.g., FC-RPC or FC-CIFS). In this case, the FC adapter hardware with or without the help of microcode/firmware, can parse the incoming transfer ready messages and then start sending the data. In an FC-RPC implementation, when the FC-RPC layer at the client makes a write request, the FC-RPC layer can also give a data pointer to the FC adapter for the data so that the FC adapter can quickly access the to-be sent data as soon as it receives a transfer ready message from the server without involving any software, such as interrupting the operating system. Likewise, on the server side an FC adapter may be given a pointer to the allocated buffer before sending the transfer ready message so that the FC adapter can steer the received data as it is immediately received.

Figure 5:
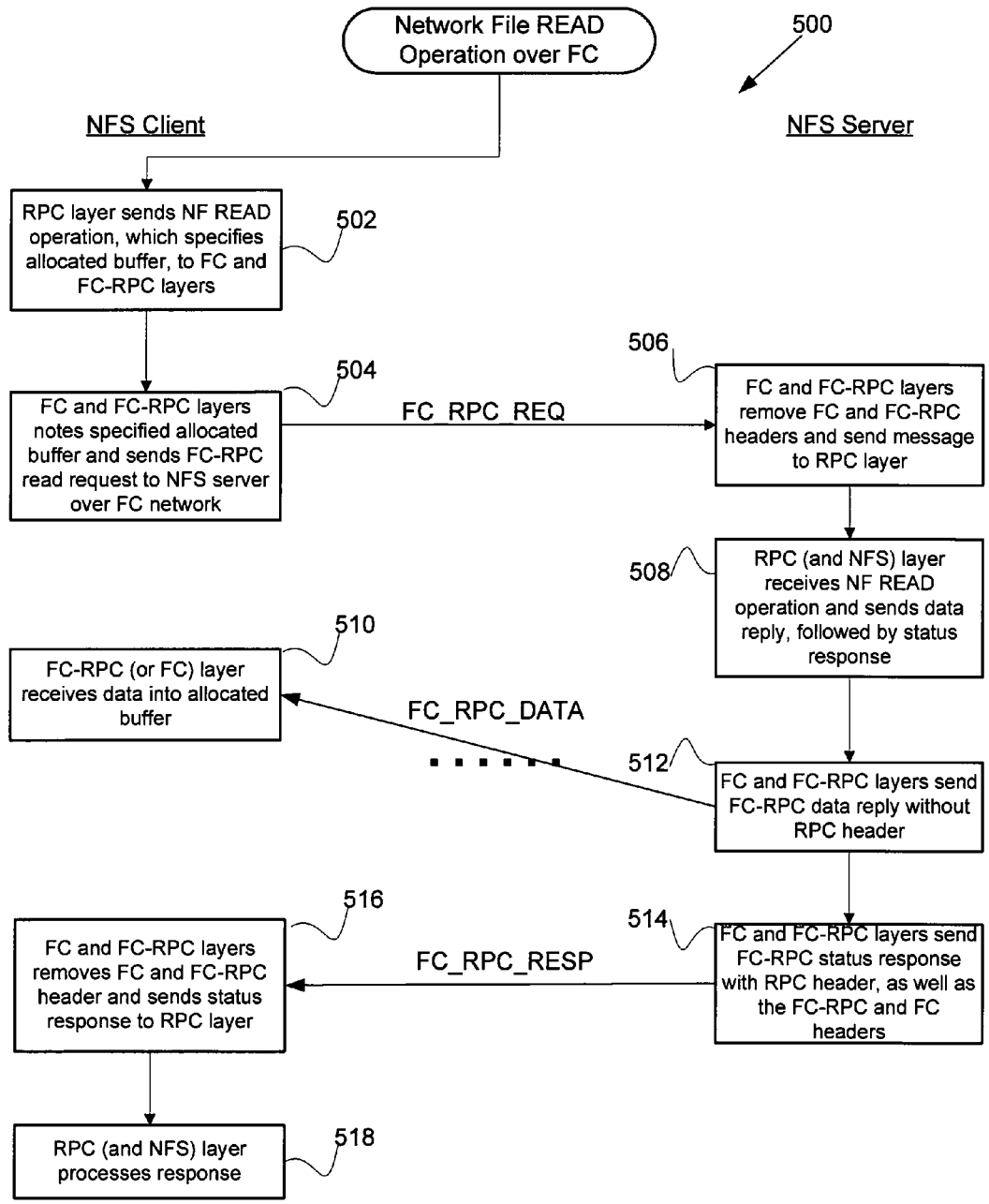
FIG. 5 is a flowchart illustrating a procedure for handling an NF read operation over a Fibre Channel network in accordance with one embodiment of the present invention.

FIG. 5 is a flowchart illustrating a procedure 500 for handling an NFS read operation over a Fibre Channel network in accordance with one embodiment of the present invention. Initially, an RPC layer of the NFS client may send an NF read message, which also specifies an allocated buffer, to FC and FC-RPC layers in operation 502.

The FC and FC-RPC layers can then note the specified, allocated buffer and send an FC-RPC read request to the NFS server over the Fibre Channel network in operation 504. For example an FC_RPC_REQ message having an FC header, an FC-RPC header, and an NFS header is sent from the NFS client to the NFS server. FC and FC-RPC layers of the NFS server may then remove the FC and FC-RPC headers and send the NF read operation to the RPC layer in operation 506. The RPC layer (and NFS layer) may then receive the NF read operation and send the data in one or more data replies, followed by an RPC status response in operation 508.

The FC and FC-RPC layers of the client may then send one or more FC-RPC-DATA type messages, for example, without the RPC header in operation 512. The FC_DATA type message may include an FC-RPC header that specifies the exchange identifier, data length, and data offset, as well as an FC header that specifies an FC_RPC type. An RPC header is not needed in a data type message since the FC-RPC layer (or a hardware accelerated FC layer) of the client can write the data into the allocated buffer without involving the RPC layer. As shown, the FC-RPC (or FC) layer of the NFS client may receive the data into the allocated buffer in operation 510.

The FC and FC-RPC layers of the NFS server may also send an FC-RPC status response with the RPC header, as well as the FC-RPC and FC headers, in operation 514. An FC_RPC_RESP message can then be sent from the NFS server to the NFS client. The FC and FC-RPC layers of the NFS client may then remove the FC and FC-RPC headers and send the status response to the RPC layer in operation 516. The RPC (and NFS) layer may then process this response in operation 518.

Generally, the techniques for implementing the present invention may be implemented on software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the authentication systems of this invention may be a specially configured switch such as the Catalyst 6500, 4900, 4500, 3750, 3560, Nexus 7000, or Express 500 Series available from Cisco Systems, Inc. of San Jose, Calif. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Figure 7:
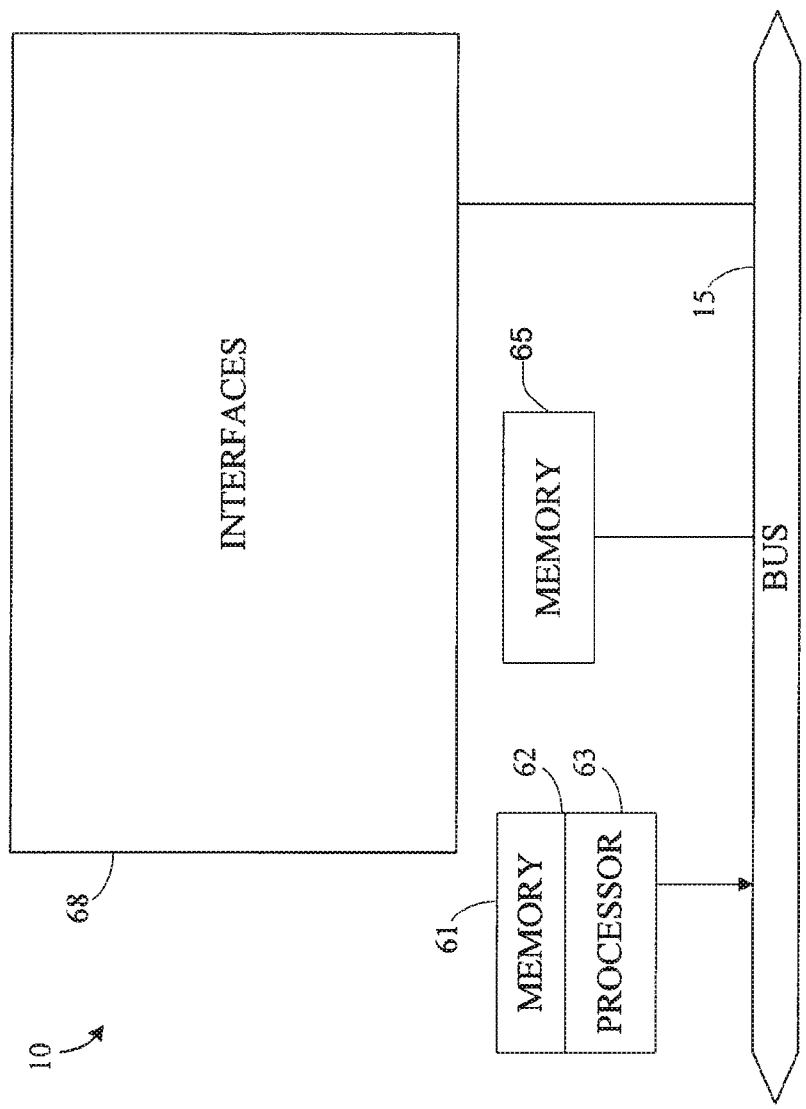
FIG. 7 illustrates an example switch suitable for implementing embodiments of the present invention.

Referring now to FIG. 7, a switch 10 suitable for implementing embodiments of the present invention includes a master central processing unit (CPU) 62, interfaces 68, and a bus 15 (for example, a PCI bus). When acting under the control of appropriate software or firmware, the CPU 62 is responsible for such tasks as switching and/or routing computations and network management. It preferably accomplishes all these functions under the control of software including an operating system (for example, the Internet Operating System (IOS®), SAN-OS, NX-OS of Cisco Systems) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of switch 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of packets or packet segments over the network and sometimes support other peripherals used with the switch 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching and/or routing, media control and management. By providing separate processors for the communications intensive tasks, these interfaces allow the master microprocessor 62 to efficiently perform switching and/or routing computations, network diagnostics, security functions, etc.

Although the system shown in FIG. 7 is one specific switch of the present invention, it is by no means the only switch architecture on which the present invention can be implemented. For example, an architecture having a single processor that handles communications as well as switching and/or routing computations, etc. is often used. Further, other types of interfaces and media could also be used with the switch.

Regardless of a network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications. The memory or memories may also be configured to store header and payload information, buffers, pointers to allocated buffers, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method comprising:
   at an interposed file access protocol layer of a file access client, receiving a file access type operation from an upper file access protocol layer at the file access client, wherein the file access type operation specifies a request pertaining to file access and the interposed file access protocol layer is interposed between a Fibre Channel (FC) layer and the upper file access protocol layer;
   at the interposed file access protocol layer of the file access client, modifying the file access type operation into one or more modified operations so that the one or more modified operations can be transmitted over an FC network;
   wherein modifying the file access type operation into one or more modified operations includes encapsulating the file access type operation with an interposed file access protocol header to for, a message,
   at the FC layer of the file access client, encapsulating the message with an FC header that has a type field that indicates that the message is an interposed file access protocol layer message; and
   transmitting the one or more modified operations to a file access server over the FC network, wherein transmitting the one or more modified operations includes transmitting the message.

2. The method of claim 1, wherein the file access type operation specifies a request other than a request for writing or reading data, and wherein the interposed file access protocol header has a field that indicates a type of message, wherein the type of message specifies that the message is a simple request, excluding a write or read request.

3. The method of claim 1, wherein the file access type operation specifies a request for writing data and modifying the file access type operation into the one or more modified operations so that the one or more modified operations can be transmitted over an FC network by:
   sending to the file access server an unsolicited write request that includes the file access type operation but excludes such file access type operation's data payload;
   retaining the file access type operation's data payload at the file access client; and
   upon receipt of one or more data transfer ready messages from the file access server, sending one or more portions of the retained file access type operation's data payload to the file access server.

4. The method of claim 1, wherein the file access type operation specifies a request for reading data into a specified, allocated buffer and wherein modifying the file access type operation into one or more modified operations so that the one or more modified operations can be transmitted over an FC network comprises sending to the file access server a read request, the method further comprising receiving and retaining data from the file access server into the specified allocated buffer of the file access client.

5. The method of claim 4, wherein the data is retained by a hardware acceleration adaptor.

6. The method of claim 1, wherein the file access type operation implement a remote procedure call (RPC) protocol or a common internet file system (CIFS) protocol, in addition to a network file system (NFS) protocol.

7. An apparatus comprising at least a processor and a memory, wherein the apparatus is in the form of a file access client and the memory is programmed with computer instructions for causing the processor to facilitate transmission of file access messages over a FC network by performing the following:
   at an interposed file access protocol layer of a file access client, receiving a file access type operation from an upper file access protocol layer at the file access client, wherein the file access type operation specifies a request pertaining to file access and the interposed file access protocol layer is interposed between a Fibre Channel (FC) layer and the upper file access protocol layer;
   at the interposed file access protocol layer of the file access client, modifying the file access type operation into one or more modified operations so that the one or more modified operations can be transmitted over an FC network;
   wherein modifying the file access type operation into one or more modified operations includes encapsulating the file access type operation with an interposed file access protocol header to form a message,
   at the FC layer of the file access client, encapsulating the message with an FC header that has a type field that indicates that the message is an interposed file access protocol layer message;
   and
   transmitting the one or more modified operations to a file access server over the FC network, wherein transmitting the one or more modified operations includes transmitting the message.

8. The apparatus of claim 7, wherein the file access type operation specifies a request other than a request for writing or reading data, wherein the interposed file access protocol header has a field that indicates a type of message, wherein the type of message specifies that the message is a simple request, excluding a write or read request.

9. The apparatus of claim 7, wherein the file access type operation specifies a request for writing data and modifying the file access type operation into the one or more modified operations so that the one or more modified operations can be transmitted over an FC network by:
   sending to the file access server an unsolicited write request that includes the file access type operation but excludes such file access type operation's data payload;
   retaining the file access type operation's data payload at the file access client; and
   upon receipt of one or more data transfer ready messages from the file access server, sending one or more portions of the retained file access type operation's data payload to the file access server.

10. The apparatus of claim 7, wherein the file access type operation specifies a request for reading data into a specified, allocated buffer and wherein modifying the file access type operation into one or more modified operations so that the one or more modified operations can be transmitted over an FC network comprises sending to the file access server a read request, the method further comprising receiving and retaining data from the file access server into the specified allocated buffer of the file access client.

11. The apparatus of claim 10, wherein the data is retained by a hardware acceleration adaptor.

12. The apparatus of claim 7, wherein the file access type operation implements a remote procedure call (RPC) protocol or a common internet file system (CIFS) protocol, in addition to a network file system (NFS) protocol.

13. An apparatus comprising:
   means for, at an interposed file access protocol layer of the apparatus, receiving a file access type operation from an upper file access protocol layer at the apparatus, wherein the file access type operation specifies a request pertaining to file access and the interposed file access protocol layer is interposed between a Fibre Channel (FC) layer and the upper file access protocol layer;
   means for, at the interposed file access protocol layer of the apparatus, modifying the file access type operation into one or more modified operations so that the one or more modified operations can be transmitted over an FC network;
   wherein modifying the file access type operation into one or more modified operations includes encapsulating the file access type operation with an interposed file access protocol header to form a message,
   means for encapsulating, at the FC layer of the file access client, the message with an FC header that has a type field that indicates that the message is an interposed file access protocol layer message; and
   means for transmitting the one or more modified operations to a file access server over the FC network, wherein transmitting the one or more modified operations includes transmitting the message.

* * * * *